United States Patent
Gilleran et al.

(10) Patent No.: US 9,022,316 B2
(45) Date of Patent: May 5, 2015

(54) SYSTEM AND METHOD FOR FAILSAFE OPERATION OF AIRCRAFT GROUND MOVEMENT SYSTEM

(75) Inventors: Neal Gilleran, Long Beach, CA (US); Robert Sweet, Beaver, UT (US); Jonathan Edelson, Portland, OR (US); Isaiah Watas Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 472 days.

(21) Appl. No.: 13/301,498

(22) Filed: Nov. 21, 2011

(65) Prior Publication Data

US 2012/0217339 A1 Aug. 30, 2012

Related U.S. Application Data

(60) Provisional application No. 61/417,213, filed on Nov. 24, 2010.

(51) Int. Cl.
*B64C 25/00* (2006.01)
*B64C 25/40* (2006.01)

(52) U.S. Cl.
CPC .............. *B64C 25/405* (2013.01); *Y02T 50/823* (2013.01)

(58) Field of Classification Search
USPC ................................ 244/50, 56, 103 S, 103 R
See application file for complete search history.

(56) References Cited

U.S. PATENT DOCUMENTS

| | | | | |
|---|---|---|---|---|
| 3,977,631 A * | 8/1976 | Jenny | | 244/50 |
| 6,935,479 B2 * | 8/2005 | Cummins et al. | | 244/60 |
| 7,445,178 B2 * | 11/2008 | McCoskey et al. | | 244/50 |
| 2008/0062011 A1* | 3/2008 | Butler et al. | | 701/120 |
| 2008/0103642 A1* | 5/2008 | Cox et al. | | 701/3 |
| 2009/0014261 A1* | 1/2009 | Edelson et al. | | 188/156 |
| 2009/0114765 A1* | 5/2009 | Cox et al. | | 244/50 |
| 2009/0261197 A1* | 10/2009 | Cox et al. | | 244/50 |

\* cited by examiner

*Primary Examiner* — Rob Swiatek
*Assistant Examiner* — Marc Burgess (57) ABSTRACT

A failsafe system and method for ensuring the safe operation of an aircraft with a ground movement system to drive the aircraft independently on the ground is provided. The system includes at least one aircraft nose or main drive wheel powered by an onboard wheel driver responsive to sensed aircraft and ground movement system operating parameters to continue operation in response to parameters within normal limits or to prevent continued operation if sensed parameters are outside normal limits and indicate continued operation to be unsafe. The onboard wheel driver includes a locking assembly responsive automatically or manually to signals indicating sensed parameters to lock the onboard wheel driver in an activated or an inactivated condition, depending on whether operation of the ground movement system can be continued safely.

17 Claims, 5 Drawing Sheets

SYSTEM AND METHOD FOR FAILSAFE OPERATION OF AIRCRAFT GROUND MOVEMENT SYSTEM

PRIORITY

This application is based on and claims priority from U.S. Provisional Patent Application No. 61/417,213, filed Nov. 24, 2011, the disclosure of which is fully incorporated herein.

TECHNICAL FIELD

The present invention relates generally to controls for systems used to move aircraft on the ground between landing and takeoff and specifically to controls with failsafe mechanisms designed to ensure activation of a ground movement system only when the aircraft is on the ground and to prevent activation when selected ground movement system and aircraft operating parameters indicate that continued operation would not be safe.

BACKGROUND OF THE INVENTION

Commercial airports throughout the world have become extremely busy as air traffic has increased. Moving aircraft efficiently on the ground, first between landing and the gate or other landing facility to discharge passengers and cargo and then from the gate to the runway for take off, can pose challenges. Most aircraft currently require external tow vehicles or tugs to move them into or out of a gate or other landing facility. The aircraft's jet engines may also be used to help move the aircraft into or away from a gate. Both of these methods, while useful for moving aircraft, have disadvantages. Tow vehicles may not always be available for all aircraft when needed, especially when air traffic is heavy. The lack of availability of a tug or tow vehicle has the potential to delay significantly the aircraft's arrival at or departure from a gate. Waiting during such delays can be especially frustrating for passengers and crew. It is possible to back an aircraft away from a gate using the engine's reverse, thrust. This process is generally discouraged, however, because reverse thrust engine operation picks up foreign object debris (FOD) and directs FOD from the engine toward the gate, airport terminal, and everything in between. If an aircraft's main jet engines are used to move it into the gate or on the ground, fuel consumption, engine emissions, and noise are significant concerns. Moreover, engine maintenance demands for this type of aircraft ground movement tend to be high.

The aforementioned disadvantages can be overcome by providing apparatus for moving an aircraft on the ground between landing and takeoff that does not require the use of the aircraft's engines or external tow vehicles, but employs structure integral to the aircraft that enables the aircraft to be driven while on the ground. An example of such an apparatus is described in commonly owned published U.S. Patent Application No. US/2009/0261197 to Cox et al. The aircraft is effectively driven between landing and takeoff by one or more powered, self-propelled wheels without use of the aircraft's engines or assistance from tugs, tow vehicles, or the like.

Control of the ground movement of an aircraft using a powered or self-propelled wheel effectively addresses the problems arising from the use of presently available systems that are not independently driven. It is desirable, however, to be able to control the actuation of the wheel system that independently propels the aircraft to ensure that this system is activated and functional only when the aircraft is on the ground between landing and takeoff and, in addition, is operating safely. A failsafe system that prevents activation of the aircraft ground movement system and deactivates the aircraft ground movement system when the ground movement system should not be activated or cannot function safely to control aircraft ground movement is particularly desirable.

Backup control and failsafe systems for aircraft functions are known. Published U.S. Patent Applications Nos. US/2009/0177338 to Henderson et al and US/2008/0291592 to Zols, for example, respectively disclose an airplane electrical control system including redundancy to prevent loss of sensor information and a circuit breaker system useful in an aircraft on-board power system that provides current if the main current path is interrupted. In U.S. Pat. No. 7,622,818, Ausman et al provide a backup circuit that guarantees power delivery to the aircraft in case of failure of a computer-controlled switch and provides an indication to the pilot that the backup circuit is engaged. Stonestreet, II et al describe a dedicated power control and distribution system connected to an aircraft electric power supply useful for controlling a de-icing system in U.S. Pat. No. 7,355,302. A failsafe monitor senses and analyzes temperature, current, and other parameters, relating primarily to de-icing operations to ensure effective operation of the system. None of these disclosures suggests that the control systems or circuits described therein could be used in connection with a powered wheel or an aircraft ground movement system to ensure the safe operation of such a system.

U.S. Pat. No. 6,671,588 to Otake et al describes several embodiments of a system and method for controlling travel direction of an aircraft using automatic differential braking to produce changes in direction after landing and before takeoff. This system prevents malfunction of the braking mechanism when the aircraft is changing direction. Braking of the landing gear wheels may be achieved by the operation of a single brake pedal that communicates with the engine throttle control and applies a braking force depending on information received from a detector able to detect the operation state of a pilot control stick. Throttle opening and speed are judged to determine if the aircraft is in condition for flight. Very safe braking of the aircraft is possible because a failsafe arrangement prevents erroneous operation of the throttle position sensor by referring to the engine manifold pressure value and the throttle opening value to judge whether or not the airplane has landed. Otake et al, however, is notable for the absence of any suggestion that the multiple embodiments of the travel direction control system disclosed therein could be employed to ensure the safe operation of a powered aircraft wheel ground movement system.

Sibre, in U.S. Pat. No. 7,344,207, describes an apparatus used to prevent untimely braking in an aircraft electromechanical braking circuit that is controlled by a power switch under the control of a logic circuit. The switch is open by default in a no power condition and closed by a braking confirmation signal that can be a normal mode active braking signal, an emergency mode in which the braking signal is absent, and a parking mode confirmed by a parking signal. A powered failsafe brake is provided to lock the main brake actuators in a parking position, which can be maintained when the power supply to the failsafe brake is switched off. There is no suggestion in Sibre that the control or logic circuits disclosed to be effective in providing failsafe braking could be used in connection with any other aircraft functions.

A failsafe useful for protecting an aircraft engine in the event that the engine electronic control system malfunctions is disclosed in U.S. Pat. No. 4,718,229 to Riley. The control system is monitored, primarily for engine overspeed, fuel flow and temperature, and a failsafe mode is activated if a predetermined limit of the monitored parameter is exceeded. Another failsafe useful in an aircraft is described in U.S. Pat. No. 6,659,398 to Serven. This failsafe uses a two brake torque limiting device on a drive shaft line that may include an electromagnetic failsafe brake to ensure that flaps on an airplane wing are positioned to reduce asymmetry. While the systems described by Riley and Serven may be especially useful for providing failsafe operations in connection with aircraft fuel control or compensating for asymmetries in flaps and slats on an airplane wing, neither suggests that the particular failsafe described therein could be adapted to ensure the safe operation of other aircraft components and functions.

The prior art, therefore, does not disclose a failsafe system and method useful for controlling and ensuring control of the safe operation of a powered aircraft drive wheel in an aircraft ground movement system.

SUMMARY OF THE INVENTION

It is a primary object of the present invention, therefore, to provide a failsafe system and method for controlling and ensuring control of the safe operation of a powered aircraft drive wheel in an aircraft ground movement system.

It is another object of the present invention to provide a failsafe system and method that ensures safe operation of a powered aircraft drive wheel when an aircraft equipped with such a wheel is operated on the ground and is inoperable at all times when the aircraft is in flight.

It is a further object of the present invention to provide a failsafe system for ensuring safe operation of a powered aircraft drive wheel that is controllable between an engaged state in which a wheel driver is fully powered and operable to move the wheel in a desired direction at a desired speed and a disengaged state in which the wheel driver is rendered inoperable and incapable of moving the wheel in any direction when continued operation would not be safe.

It is another object of the present invention to provide a failsafe system for ensuring safe operation of a powered aircraft drive wheel that is responsive to any one or more of a group of selected aircraft operating parameters, whereby an onboard driver powering the wheel is actuated or not actuated in response to indication by a selected operating parameter that continued operation is safe or not safe.

It is yet another object of the present invention to provide a failsafe system for ensuring safe operation of a powered aircraft drive wheel with a driver that is controllably engaged or disengaged in response to signals indicating the presence or absence of power.

It is an additional object of the present invention to provide a failsafe system that ensures the safe operation of a powered aircraft drive wheel that is activated automatically, but may also be activated manually.

It is yet a further object of the present invention to provide a failsafe system that ensures the safe operation of a powered aircraft drive wheel while avoiding conflict with the operation of the aircraft landing gear wheel brakes.

It is a still further object of the present invention to provide a failsafe system that ensures the safe operation of a powered aircraft drive wheel by maximizing opportunities to disengage the wheel driver when continued operation would not be safe.

It is yet an additional object of the present invention to provide a method for ensuring the safe operation of an aircraft ground movement system with a powered, self-propelled drive wheel.

In accordance with the aforesaid objects, the present invention provides a failsafe system and method for ensuring the safe operation of an aircraft ground movement system with a powered, self-propelled drive wheel. The failsafe system is a multiple component failsafe system integral with the aircraft ground movement system. The failsafe system may include or communicate with a plurality of sensors to receive information relating to selected operating parameters and communicate the information to selected aircraft systems, the ground movement system, and/or a powered wheel driver. In the event predetermined limits associated with the selected operating parameters are within or outside normal limits, control components of the failsafe system receive appropriate signals and, accordingly, activate or deactivate components of the aircraft ground movement system and/or powered wheel driver as required to take appropriate responsive action. The failsafe system of the present invention is designed to operate automatically, but may also operate in response to cockpit controls. Both manual and automatic operation in response to specific situations that require a change in function of any of the components of the aircraft ground movement system or the wheel driver may also be provided.

The present invention further provides a method for ensuring the safe operation of an aircraft ground movement system with a powered drive wheel between landing and takeoff that ensures the inoperability of the wheel driver in specific predetermined situations or when the aircraft is in flight.

Other aspects of the failsafe system and method of the present invention will become apparent from the following description, drawings, and claims.

DESCRIPTION OF THE INVENTION

The failsafe system and method of the present invention functions integrally with the components of an aircraft ground movement system that includes at least one drive wheel powered by an onboard driver. Such an aircraft ground movement system is designed and configured to operate substantially completely independently from other aircraft systems. Power for certain of the ground movement system components may be drawn from any of the aircraft power supply and distribution systems, as will be described below.

No data is shared between aircraft control systems and the present ground movement system, moreover, so interaction with the aircraft's data bus is not required.

The aircraft ground movement system of the present invention is designed to be operational only when the aircraft is moving on the ground, such as between landing and takeoff or between the runway and a hangar. The system is nonoperational when the aircraft is no longer on the ground and in flight and, additionally, under selected conditions when the aircraft is moving on the ground to ensure safe operation of the aircraft. To achieve this, the failsafe system and method of the present invention provides sensing, monitoring, communication, and control components with multiple redundancies to ensure automatic or manual deactivation of the ground movement system when conditions indicate that its operation should not be continued.

The aforementioned aircraft ground movement system is particularly useful in an aircraft of the type that has at least one drive wheel powered by an onboard driver, a cockpit controls array that can include controls which can be activated manually or set to be activated automatically to perform various aircraft functions, including functions related to the operation of a powered drive wheel and onboard driver, and a power supply and distribution system capable of drawing power from aircraft or other power sources. Although the ground movement system is preferably associated with one or more nose wheels, it is contemplated that this ground movement system and the failsafe system described herein could also be effectively employed with any of the aircraft wheels, including the landing gear wheels. The controls array may also include monitors and indicators that communicate required and selected information to the pilot and other cockpit personnel as required for the safe operation of the aircraft.

Figure 1:
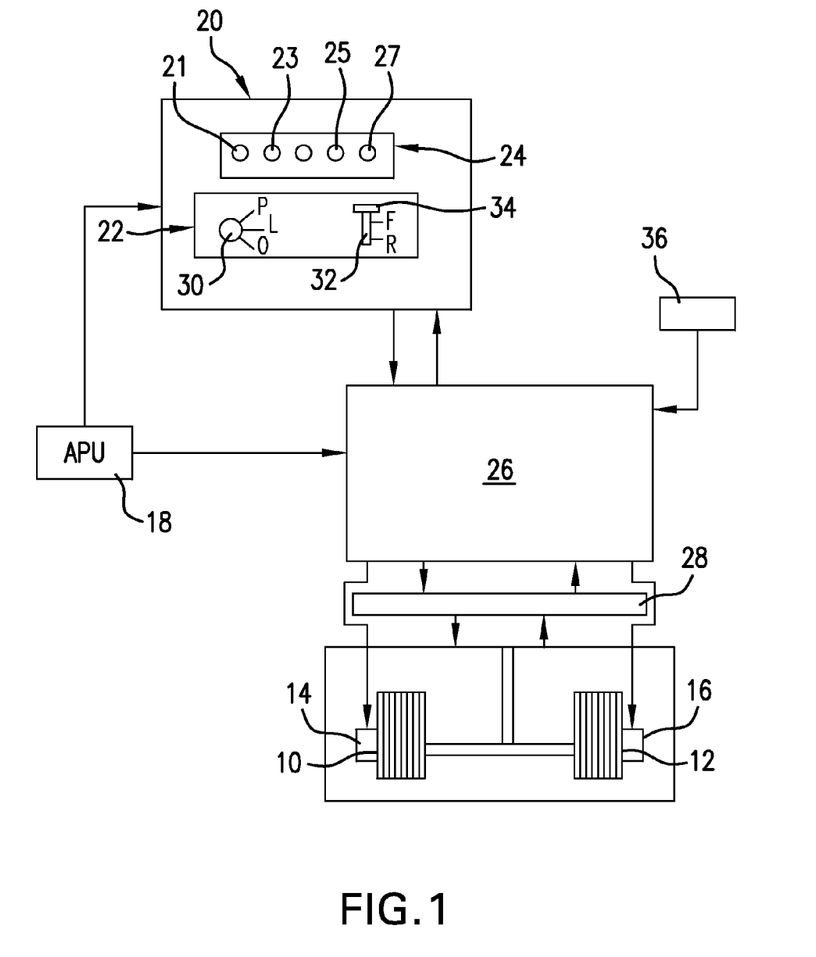
FIG. 1 is a schematic diagram of the main components of an aircraft ground movement system with a pair of powered, self-propelled wheels and wheel drivers.

FIG. 1 illustrates, schematically, the main components of an aircraft ground system with a pair of wheels 10, 12, powered respectively by wheel drivers 14, 16. A preferred power source for the wheel drivers 14, 16 is the aircraft auxiliary power unit (APU) 18. Power for the wheel drivers 14, 16 may also be provided by other power sources currently in or added to the aircraft power supply and distribution system, including, but not limited to, the engine auxiliary power unit, battery systems, wing engines, POWER CHIPS™, fuel cells, solar power units, and burn boxes. The power supply to the wheel driver could be designed to switch between these different power sources, if needed, thus providing redundancy in the power supply. In addition, if the aircraft does not have an APU, one or more of the foregoing power sources could power the wheel drivers 14, 16.

While a preferred location for a driver is adjacent to or within an aircraft wheel as shown in FIG. 1, driver locations are not limited. A driver can be positioned at any location where it can be connected with one or more aircraft wheels to provide the driving power required to move the aircraft wheel or wheels at a desired speed or torque and, hence, the aircraft at a desired speed on the ground. Possible locations for one or more drivers in addition to those within or adjacent to a wheel include, without limitation, on or near the wheel axle, in, on or near a landing gear bay or landing gear component, or any convenient onboard location in, on, or attached to the aircraft.

The ground system includes a cockpit interface 20 with a controls array 22 and visual indicators 24. A system controller 26 is designed to interface with the APU 18 or other power source, the cockpit interface 20 components, specifically the controls array 22 and the visual indicators 24, the wheel drivers 14, 16, and selected sensors 28 that monitor ground movement system and selected aircraft operating parameters. Interconnections are provided between and among these components to enable them to cooperatively operate the aircraft ground movement system.

The cockpit controls array 22 includes at least a guarded multiple position power switch 30 in communication with the APU 18 or other power source and a pilot input device 32, equipped with a manually or automatically actuated lock mechanism 34, which are also components of the failsafe system of the present invention as will be described in detail below.

The visual indicators 24 communicate information regarding the status of the ground movement system and failsafe system of the present invention. They preferably are designed to be seen easily to alert the cockpit crew in the event action is required by the system status, that operation is normal and no action is required, or to communicate any other desired information. The indicators 24 are preferably lights of the type available for use in aircraft cockpit arrays and will preferably include at least one light 21 to indicate that the ground movement system is in operation and operating normally and one light 23 to indicate that the ground movement system is not operating normally, requiring appropriate action by the cockpit crew. Since the aircraft ground movement system is not intended to be actuated at takeoff or when the aircraft is in the air, an indicator 25, preferably a flashing red light or the like, is preferably included among the visual indicators 24 to warn the cockpit crew that the aircraft is not ready for take off. In addition, one or more other flashing or strobe-type lights 27 could be provided to indicate specific system conditions or faults in accordance with the failsafe system of the present invention.

The guarded multiple position power switch 30 can be directly activated by the pilot to power the aircraft ground movement system, if required. Ideally, the power switch 30 provides at least three settings corresponding to three power levels: an OFF mode in which the aircraft ground movement system and all of its components are completely unpowered; a LOGIC mode in which only system logic electronics and parasitic components are powered; and a POWER mode in which primary loads, including the wheel drivers 14, 16, are powered, and current flows to them. No power flows to the wheel drivers at any other power setting.

The pilot input device 32 may be a thumbwheel which is operationally and drivingly connected to the aircraft wheel drivers 14, 16. Although a thumbwheel is one preferred pilot input device, other pilot input devices, such as, for example, joysticks, track pads, roller balls, switches, dials, potentiometers, touch screens, keyboards, toggles, wheels, levers, and voice-activated devices could also be used for this purpose. Optimally, the pilot input device 32 may be a proportional single axis type of thumbwheel that can be moved from a neutral position forward (toward the front of the aircraft) and reverse (toward the rear of the aircraft), designated by "F" and "R". The movement of the thumbwheel 32 in a forward direction corresponds to the forward movement of the aircraft, and the movement of the thumbwheel 32 in a reverse direction corresponds to the backward or reverse movement of the aircraft. The thumbwheel 32 is preferably set so that it is linearly scaled between zero torque and the maximum forward torque on the nose wheel or other drive wheel. As a result, if the thumbwheel is moved to a position one-third of the way forward, the torque requested is one-third of the maximum drive wheel forward torque.

As a component of the failsafe system of the present invention, the pilot input device or thumbwheel 32 includes an override torque setting in the event that conditions require a torque above the preset maximum. The pilot is able to move the input device beyond the maximum torque setting to produce an overload torque. Since this is not a normal operating condition, movement of the input device 32 to the override setting is accomplished with considerably higher resistance, making the pilot aware that the operating conditions are not normal. Additionally, redundant springs (not shown) are provided to move the input device 32 between a position in which the wheel driver is actively driven at a desired torque and a zero torque position. This ensures that when the input device 32 is not actively controlled by the pilot or held at a desired setting by the lock 34 as described below, the input device will always return to a zero torque setting. The release of the input device from a forward or reverse position will return it to a neutral position, with the result that the wheel drivers are inactivated and disengaged, and the aircraft is not actively driven in either a forward or a reverse direction.

The lock mechanism 34, which may be constructed in any one of a number of convenient configurations, has a function that is similar to that of cruise control in an automobile. Lock 34 can be used to maintain the pilot input device 32 in a position that maintains the wheel drivers 14, 16 at a desired torque or speed setting. Once the pilot has brought the aircraft to this desired setting using the input device 32, the lock 34 is engaged, this information is communicated to the wheel drivers, and the ground movement system controller 26 instructs the wheel drivers to apply the necessary forward speed and torque to maintain the speed and torque that was set when the lock 34 was engaged. Disengagement of the lock 34 could occur if any one of the following events occurs. If the pilot intentionally or unintentionally moves the lock, disengaging it, the input device 32 will return to a neutral or a zero torque position. If the pilot moves the input device 32, the lock 34 will be released. If the pilot applies the aircraft's brakes 36, a signal indicating that the brakes were applied is sent to the system controller 26 and then to the cockpit interface 20, signaling the automatic release of the lock 34. The input device 32 then returns to a neutral or zero torque position, which inactivates the wheel driver or wheel drivers. Any new pilot input to a ground movement system component or to a component that interfaces with a ground movement system component could override a previously set torque and speed setting.

Movement of an aircraft by an aircraft ground movement system is achieved by providing one or more onboard wheel drivers 14, 16 (FIG. 1) mounted in driving relationship with one or more the aircraft wheels to move the wheels at a desired speed and torque. The wheel driver should be capable of translating torque through aircraft wheels and controllable to move an aircraft on the ground. Wheel drivers useful for this purpose may be selected from those known in the art. One wheel driver preferred for this purpose is a high phase order electric motor of the kind described in, for example, U.S. Pat. Nos. 6,657,334; 6,838,791; 7,116,019; and 7,469,858, all of which are owned in common with the present invention and the disclosures of which are incorporated herein by reference. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric or other kind of motor capable of driving an aircraft on the ground, including but not limited to electric induction motors, permanent magnet brushless DC motors, switched reluctance motors, hydraulic pump/motor assemblies, and pneumatic motors may also be used to power wheel drivers 14, 16. Other motor designs capable of high torque operation across the required speed range that can be integrated into an aircraft drive wheel or located in driving relationship with an aircraft drive wheel to function as described herein may also be suitable for use in the aircraft ground movement system of the present invention.

Figure 2:
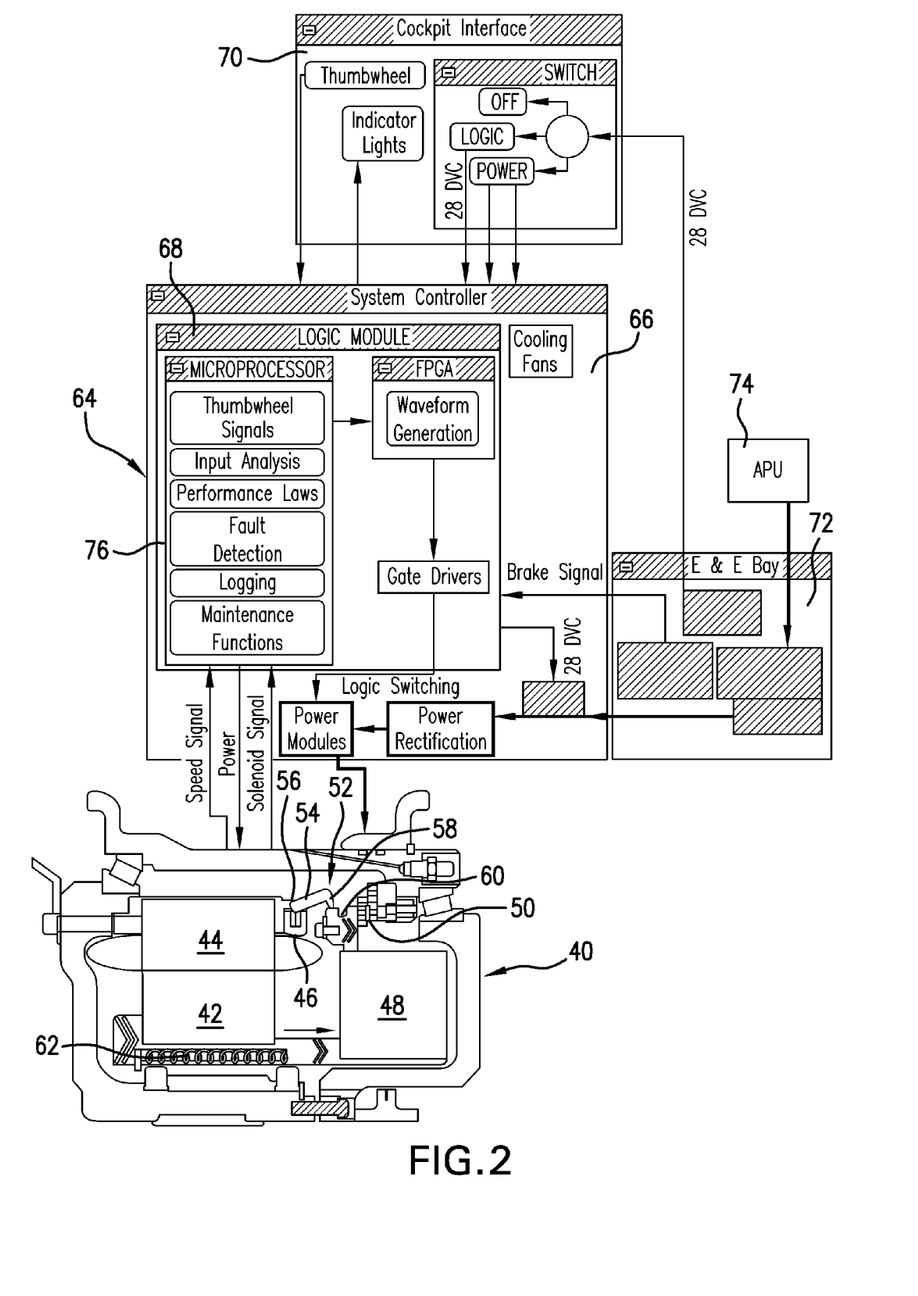
FIG. 2 is a diagrammatic view of a powered wheel driver in relationship to a block diagram of a system controller and other system components for controlling and coordinating the operation of an aircraft ground movement system showing the failsafe system of the present invention and a wheel driver in an engaged condition.
Figure 3:
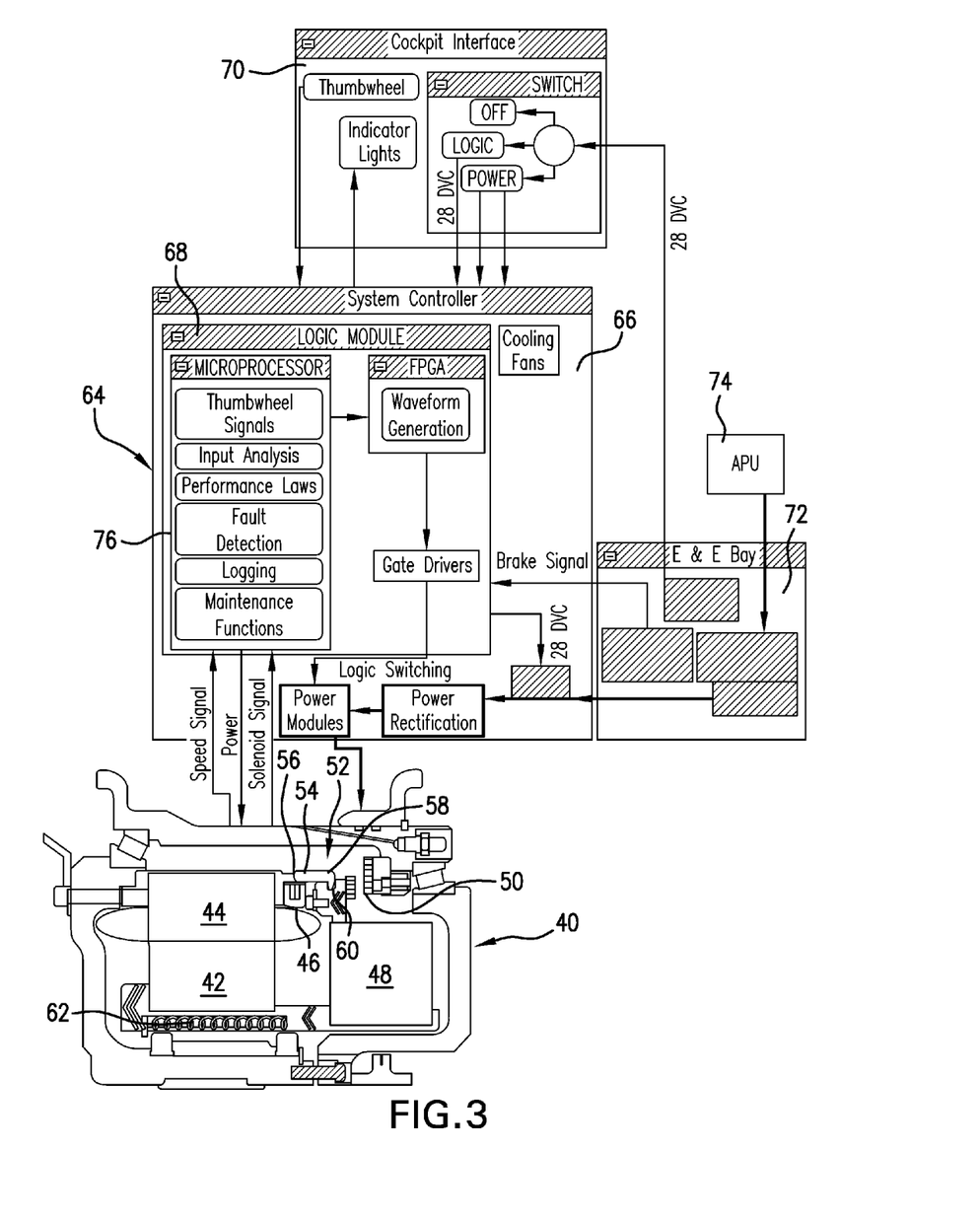
FIG. 3 is a diagrammatic view of a powered wheel driver in relationship to a block diagram of a system controller and other system components for controlling and coordinating the operation of an aircraft ground movement system showing the failsafe system of the present invention and a wheel driver in a disengaged condition in response to an aircraft or ground movement system operating parameter that would render continued operation of the wheel driver unsafe.

FIGS. 2 and 3 illustrate diagrammatic views of one configuration of a powered wheel driver 40 in functional relationship with a block diagram of a system controller for controlling and coordinating the operation of an aircraft ground movement system, showing elements of the failsafe system of the present invention and a wheel driver in an engaged or activated condition and in a disengaged or inactivated condition. In the activated condition shown in FIG. 2, the wheel driver 40 may be powered to rotate a wheel to move an aircraft on the ground. In the inactivated condition shown in FIG. 3, the wheel driver 40 has been rendered inoperative and cannot rotate a wheel, thus preventing ground movement of the aircraft. The wheel driver 40 can be drivingly connected to one or more aircraft wheels, including nose wheels, main landing gear wheels, or other wheels, from any convenient onboard location, depending on what type of arrangement works best for a particular aircraft.

Wheel driver 40 components include a rotor 42, a stator 44, a solenoid 46, and a gear assembly 48 drivingly connected to the stator, preferably by a clutch assembly 50, although an equivalent coupling or clutch type structure known in the art that performs the same function is also contemplated for this purpose. The gear assembly 48 may include planetary or other types of gears with gear ratios that are appropriate for this type of wheel driver.

Engagement and disengagement of the wheel driver 40 is accomplished by the selected actuation of a lock assembly 52 located near the solenoid 46. The lock assembly 52 includes a latch arm 54 pivotally connected at a first pivot end 56 adjacent to the solenoid 46. A second lock end 58 of the latch arm 54 is configured to contact and be engagingly retained in a correspondingly configured groove 60. The hook shape of lock end 58 is one convenient configuration for this structure. Other configurations suitable for retaining a pivoted arm securely in a locked position could also be employed. When the lock assembly 52 is in the disengaged condition shown in FIG. 2, the latch arm 54 lock end 58 is pivoted away from contact with the groove 60, and the clutch assembly 50 drivingly connects the gear assembly 48, the rotor 42, and the stator 44 to drive the aircraft wheel. When the lock assembly 52 is in the engaged condition shown in FIG. 3, however, the latch arm 54 is pivoted so that lock end 58 is fully engaged by the groove 60. The clutch assembly 50 is moved out of driving contact with the gear assembly 48, the rotor 42 and stator 44 cannot function, and the wheel driver 40 is rendered inoperable. The aircraft drive wheel cannot be driven when the lock assembly 52 is in this condition. A spring 62 mounted adjacent to the rotor 42 helps to hold the gear assembly 48 and clutch assembly 50 out of engagement with the stator 44, thus further preventing operation of the wheel driver components in the engaged position described above.

The failsafe system of the present invention preferably uses the aircraft ground system controller 64, shown in FIGS. 2 and 3, to receive signals from selected sensors monitoring desired aircraft and/or ground movement operating parameters, to process these signals, and to direct the operation or stop the operation of necessary failsafe system components. The present failsafe system may also operate without any input from aircraft systems or may rely on existing aircraft sensors. For example, the components of the present failsafe system can "understand" aircraft speed of less than about 15 miles per hour.

While the embodiment of the system controller shown in FIGS. 2 and 3 is preferred, other controller arrangements that accomplish the required functions may also be employed for this purpose. The system controller 64 is responsible for control and communication functions, monitoring and indicator functions, and fault detection and fault logging for each of the components in the aircraft ground movement system. While a DC link voltage pulse width modulation high phase order system is preferred for this purpose, other functionally equivalent structures are also contemplated to be within the scope of the present failsafe system. Because the primary external interface between the aircraft ground movement system and the aircraft's systems is located between the system controller and the aircraft electrical power supply and distribution system, operation of the ground movement system is substantially completely independent of every other aircraft system, and no data needs to be shared with any other aircraft system. The aircraft brake signal, however, may need to be accessed by the system controller 64 in certain appropriate situations as described below.

The system controller 64 includes control and logic modules 66 and 68. A cockpit interface 70 provides communication and control for cockpit components, and an interface 72 with an aircraft power supply source, such as APU 74 or any one or more of the power supply sources described above, routes DC power needed to power ground movement system controller functions. A wheel driver interface (not shown) communicates with the system controller. Signals indicating that initial or continued operation of the wheel driver 40 would not be safe and that the ground Movement system should not be engaged are communicated to a microprocessor 76 associated with the logic module 68. Power flow to the wheel driver is cut, which interrupts the flow of power to the lock assembly 52 associated with the solenoid. As a result, the latch arm 54 is pivoted into the locked position shown in FIG. 3, wherein the lock end 58 is fully received in the groove 60, ensuring the disengagement of the wheel driver 40. The motor cannot be driven to rotate the wheel, and the aircraft ground movement system will not be able to function as required to move the aircraft.

If conditions indicate that operation of the wheel driver is safe, power flow to the lock assembly 52 is not interrupted, and the continuous flow of power keeps the latch arm pivoted out of contact with the groove 60, as shown in FIG. 2. When the latch arm is in this position, the wheel driver 40 can safely drive the nose wheel or other aircraft wheel. If power to the wheel driver has been cut, the restoration of power will unlock the latch arm 54 and cause it to pivot out of engagement with the groove 60, which causes the gear assembly 48 to be coupled with and activate the driver 40, so that the aircraft ground movement system is functional again.

Information from sensors, for example speed or other sensors associated with the wheel or wheel driver or with related aircraft functions, can also be directed to the microprocessor 76 for appropriate response and action by the present failsafe system. For example, aircraft speed could be sensed by input from any ground speed measuring instruments, whether mechanical, electronic, or software based. Aircraft speed could also be measured indirectly by measuring the speed of a component, such as a wheel, tire, or gears, that rotates with a speed proportional to the speed of the aircraft and then calculated.

The system controller 64 draws power from the aircraft's APU 74 or any of the aircraft power systems described above and uses various electrical components, connectors, and processors as needed to distribute AC and/or DC power, as required, to aircraft ground movement system components, as well as to components of the failsafe system of the present invention. The power provided to the wheel driver 40 is preferably a high phase order output for optimal function of the system, but, as discussed above, may be any appropriate drive or drive technology known in the art. The preferred high phase order electric motor requires phase modules arranged in series to provide the high phase order output needed by each wheel driver.

Faults in each ground movement system component are detected and logged by the system controller 64. The system controller 64 also includes control logic functions and the software functions necessary for the operation of an aircraft ground movement system, including all of the required feedback loops for speed mode, torque mode, motor/clutch engagement, and other system functions.

The failsafe system of the present invention is integral to the operation of an aircraft ground movement system and limits or prevents operation of the ground movement system when internal system conditions or external environmental conditions indicate that initial or continued operation of one or more features of the ground movement system cannot be conducted safely. The present failsafe system controls the wheel driver 40 so that the wheel driver is not actively engaged when the aircraft is in flight or in taxi mode on the runway prior to take off. FIGS. 2 and 3 show the relative positions of the locking structures of the wheel driver 40 in activated and inactivated conditions, respectively. The wheel driver must be in an unlocked, activated condition to rotate the aircraft wheel so that the aircraft can move independently on the ground without relying on operation of the main engines. Specifically, the hook end 58 of latch arm 54 of the lock assembly 52 must be pivoted out of engagement with the groove 60 for the driver 40 to function normally to power the wheel. The maintenance of this unlocked, activated wheel driver condition requires a steady supply of electric power to the motor to keep the latch arm 54 positioned out of engagement with groove 60 so that the wheel can rotate.

The failsafe system of the present invention protects an aircraft ground movement system with a powered, self-propelled drive wheel from functioning under conditions that could compromise continued safe operation of the aircraft. The present failsafe system is designed to default to disconnection and inactivation of the wheel driver in any power cut or power loss situation, whatever the cause. Power is required for motor to stay engaged and activated. As indicated above, a preferred source of power for a self-propelled wheel is the aircraft APU. However, some or all of the power required to maintain the wheel driver in an engaged, activated state could be routed from other power sources, such as, for example, aircraft engines, batteries, POWER CHIPS™, fuel cells, solar power units, burn boxes, and the like, if necessary.

In addition to the loss of power to the wheel driver 40, other ground movement system and/or aircraft system operations may automatically cause the wheel driver lock assembly 52 to engage, automatically inactivating the driver. Any indication that the aircraft is not in normal taxi mode or is in flight could result in the automatic interruption of power to the wheel driver and the locking of the lock assembly 52, inactivating of the wheel driver 40. When the wheel driver is powered and actively engaged, a cockpit indicator switch indicating the system is operating normally that can be viewed easily by the pilot is provided as described above. An indication that continued operation of the aircraft ground movement system is not safe may also be communicated to the pilot through cockpit indicators, and the pilot can manually inactivate the wheel driver. Although the preferred operation of the present failsafe system is automatic, some control over the system by the cockpit crew may be provided. Overspeed faults, for example, could be indicated to the pilot, preferably by a blinking yellow light, or other obvious indicator, in the cockpit controls array, and the pilot can then take the necessary steps to inactivate the wheel driver.

The failsafe system of the present invention may include sensors responsive to parameters such as speed, torque, acceleration, skid sensing, and the like, for example. Speeds in excess of a selected maximum, acceleration rates suggesting that takeoff roll has begun, or any information showing that the aircraft is not in normal taxi mode are illustrative situations potentially indicative of unsafe continued operation of the wheel drivers. Environmental conditions affecting the runway travel surface, such as excess rain water, ice, and snow can cause the aircraft to skid and adversely affect normal aircraft ground movement. The parameters relating to these situations could be sensed, measured, or calculated and then processed by the system controller and, if warranted, the present failsafe system would cut power to the motor to lock the driver lock assembly 52 latch arm 58, inactivating the wheel driver 40 and preventing independent ground movement of the aircraft. Any information, sensed, calculated or inferred, that self-propelled aircraft drive wheel ground movement is not normal and should not be continued forces a disconnect of the wheel driver.

The failsafe system of the present invention may be configured to require pilot input to unlock the lock assembly 52 and re-engage the wheel driver 40, although automatic unlocking in response to a sensed signal that continued operation of the wheel driver is safe is preferred. In the case of some situations that activate the present failsafe system, such as, for example, overspeeds, the ground movement system wheel driver will not re-engage unless the pilot cycles the cockpit switch 30 (FIG. 1) through the LOGIC mode, then the POWER mode, and finally to the OFF mode. This required action also avoids any inadvertent engagement of the wheel driver if, for example, the switch 30 is left on while the aircraft is in flight. Because the wheel driver is designed to disengage when selected conditions are met, there is no cycling of the switch during ordinary operation. Pilot error or oversight could be corrected by cycling the switch. A dedicated cockpit control could be provided, if desired, to permit the pilot to activate a contactor that would disengage and lock the wheel driver if it became evident that continued operation of the ground movement system would be inadvisable or unsafe for any reason. For example, the multiple position switch 30 in the cockpit controls array 22 (FIG. 1) has two settings that direct power flow through the system. The first setting, which is the LOGIC mode, powers only the computer logic module functions, sensors, and parasitic components to determine whether activation of the entire system is safe. Switching the system to the LOGIC mode when the logic circuit has received information indicating that the ground movement system is not ready to be activated causes it to shut down. The system will not work until the switch is turned off and then on.

An additional operation that may be incorporated, into the present failsafe system is a system logging function that could be used to optimize pilot training. All normal ground movement system disengagements and all ground movement system disengagements resulting from cycling of the switch 30 would be logged. This data would then be available for analysis and use as appropriate.

If the wheel driver 40 failed to disengage while the aircraft was taxiing for takeoff, this would be detected by the failsafe system of the present invention and indicated to the pilot at the cockpit controls array by an indicator. The aircraft could then be prevented from taking off, ensuring that the wheel driver is never engaged in flight.

One of the aircraft systems that is not specifically part of the powered drive wheel ground movement system but that is monitored by the failsafe system of the present invention is the aircraft brake system. The aircraft brake system generally operates to slow the rotation of the aircraft main landing gear wheels rather than the aircraft nose wheels. When an aircraft brake is applied, a signal is sent to the system controller 64, where it is processed and communicated to the wheel driver 40, causing the lock assembly 52 automatically to engage, disengaging and inactivating the wheel driver. Because the wheel driver "fails" in a disengaged and locked condition, the aircraft would still be able to take off. A brake signal is routinely sent to numerous aircraft systems automatically. A brake signal may also be sent to the cockpit, communicating to the pilot that the aircraft brake was applied and the wheel driver requires manual disengagement. The aircraft's brakes are invariably applied between the start of the aircraft's engines and the takeoff roll or engagement on the runway, when activation of the wheel driver is not required. This failsafe action also avoids conflict between the wheel driver and the aircraft brakes.

The present invention relates, in addition, to a failsafe method that ensures the safe operation of an aircraft ground control system with at least one powered, self-propelled drive wheel. This method may employ an array of sensors that monitor and obtain information about selected aircraft and/or ground movement system operating parameters. The information is communicated to a system controller processor, where it is read and compared to predetermined operating parameter normal indicia. Any necessary calculations are performed by the processor. If the operating parameters are found to be within normal limits, no change in aircraft ground movement or operation of the powered wheel driver is required, and information indicating that the system is normal and continued operation is safe may be communicated to the cockpit, preferably in the form of a steady green indicator light, although other devices could also be used. If the selected operating parameters are measured, calculated, or inferred to be outside normal limits so that continued aircraft ground movement or operation of the powered wheel driver is determined to be inadvisable or unsafe, that state is signaled to the cockpit, preferably by a change of the normal green light indicator to a flashing yellow. Appropriate manual action can then be taken by the pilot to inactivate the wheel driver by engaging a lock assembly. A control signal could also be sent automatically to one or more selected aircraft power supply sources to stop the flow of power to the wheel driver and simultaneously to the lock assembly, causing the latch arm to pivot into an engaged, locked position, inactivating the wheel driver.

Figure 4A:
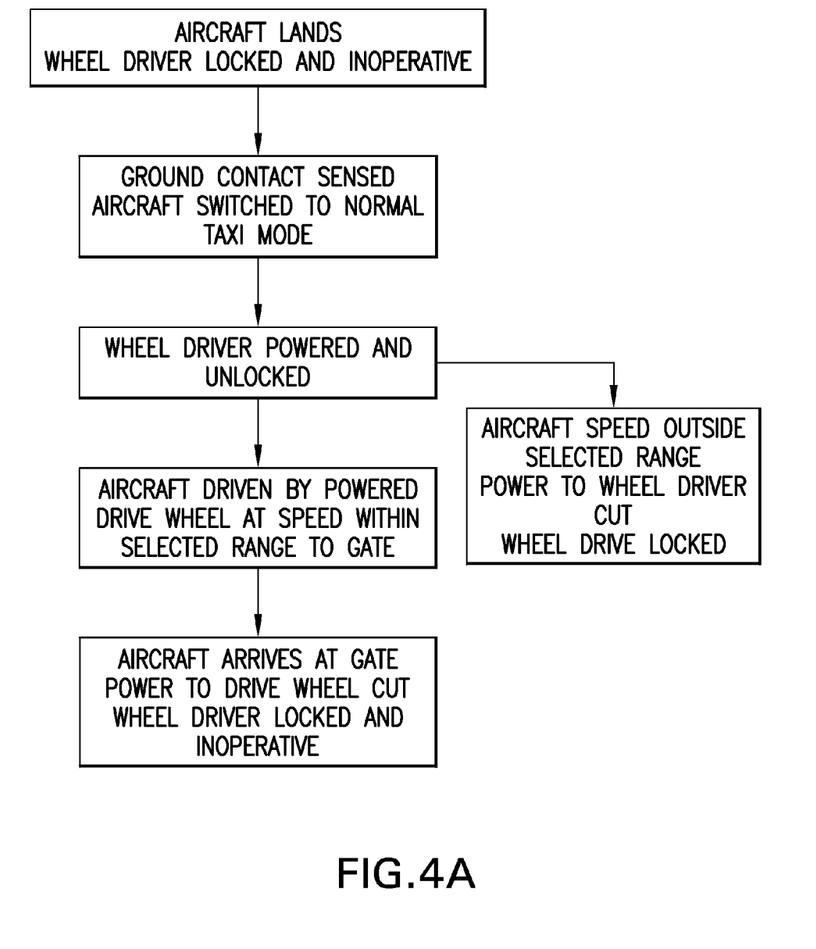
FIGS. 4a and 4b are flow charts depicting, respectively, one embodiment of the steps between landing and takeoff of a method for ensuring the safe operation of an aircraft ground movement system with a powered drive wheel in accordance with the present invention.
Figure 4B:
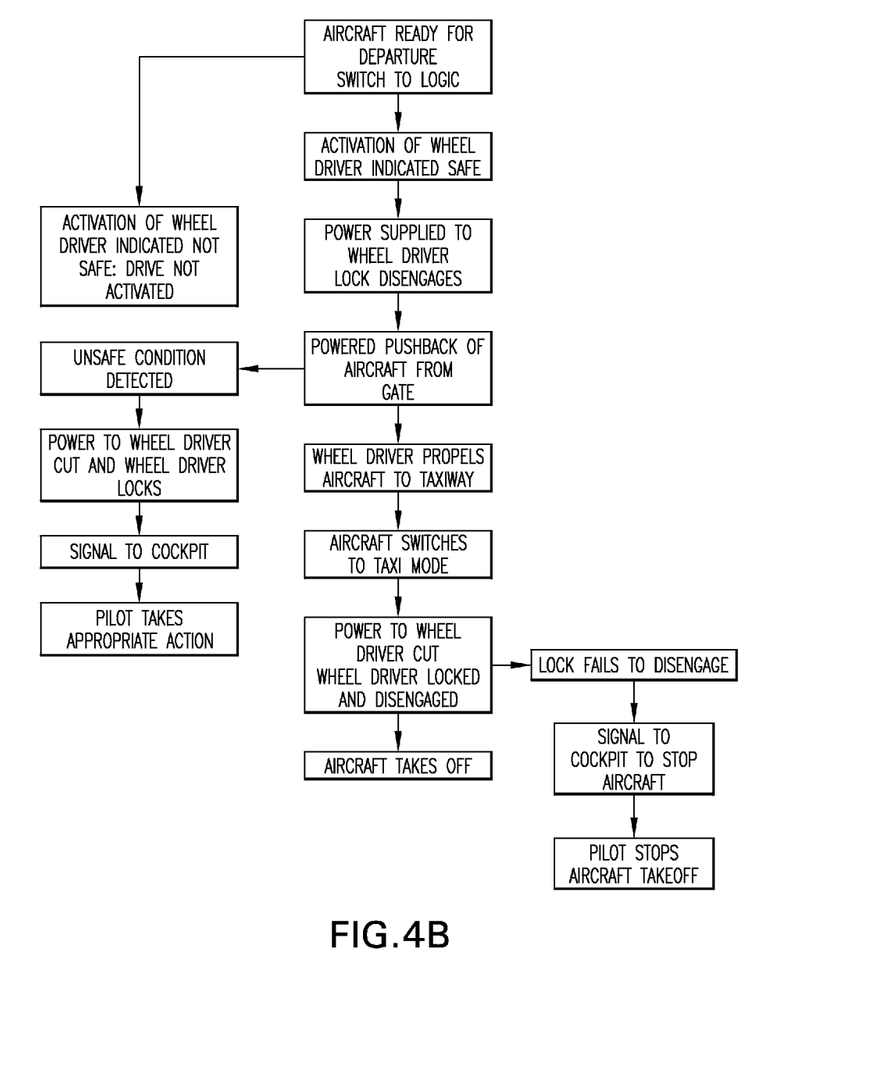

FIGS. 4a and 4b show the steps of a failsafe method in accordance with the present invention. FIG. 4a shows one embodiment of the present failsafe method as it could operate upon landing of an aircraft equipped with the present failsafe system. As the aircraft lands, the wheel driver lock is in the locked condition shown in FIG. 3, and the wheel driver is inoperative. When the aircraft touches down, ground contact is sensed, and the aircraft switches automatically from flight mode to normal taxi mode. If aircraft speed is sensed to be within a selected range, power is supplied to the ground movement system wheel driver, causing the lock to disengage and the wheel driver to be activated. If the aircraft speed is sensed to be outside the selected range, the wheel driver lock remains locked. The ground movement system is operational to drive the aircraft without assistance from the engines to the gate. Upon arrival at the gate, power to the wheel driver is cut, causing the wheel driver lock to pivot into a locked condition and the wheel driver to become inactivated.

FIG. 4b illustrates the steps of the one embodiment of the present failsafe method as it could operate when the aircraft is ready to depart from the gate and take off. Before departure from the gate, the cockpit switch is moved to the LOGIC mode setting. If activation of the ground movement system is determined to be safe, power is supplied to the wheel driver, causing the lock to disengage and the drive wheel to become activated and capable of propelling the aircraft in reverse to push back from the gate. If activation of the ground movement system is determined not to be safe, the cockpit switch will automatically return to the OFF position, and the wheel driver will not be powered, but will remain locked and inoperative. Following pushback, the aircraft is propelled by the ground movement system to a taxiway, where it prepares for takeoff. Power to the wheel driver is cut, causing the lock to engage and the wheel driver to become inoperative. The wheel driver remains locked and inoperative during takeoff and in flight until it is powered and activated again after the aircraft lands. If an unsafe condition, such as, for example, speed in excess of a selected maximum, is sensed after pushback and prior to takeoff, power to the wheel driver will be cut, the wheel driver lock will be locked and the wheel driver rendered inoperative, and a signal indicating this will be sent to the cockpit so the pilot can take appropriate action.

Additional redundancies and feedbacks could also be designed in accordance with the present failsafe system and method, both to prevent continued operation of aircraft ground movement by a powered onboard wheel driver when conditions indicate it to be unsafe and to resume the interrupted ground movement when conditions indicate that ground movement may be safely continued.

The present failsafe system and method for ensuring safe operation of an aircraft with a ground movement system has been described with respect to preferred embodiments. Other, equivalent, structures and processes are also contemplated to be within the scope of the present invention.

INDUSTRIAL APPLICABILITY

The failsafe system and method of the present invention will find its primary applicability in connection with ensuring the safe operation of an aircraft with aground movement system that incorporates a powered onboard wheel driver. This failsafe system and method may also be employed in other applications, within or without the aircraft field, in which it is desired to control the operation of an electric driver or motor with a lock mechanism associated with the motor solenoid movable between a locked position in which the motor is disengaged and cannot rotate or cause the rotation of a connected rotary element and an unlocked position in which the motor is engaged and able to rotate and cause the rotation of a connected rotary element.

The invention claimed is:

1. A failsafe system for ensuring the safe operation of an aircraft equipped with a system for independent ground movement comprising at least one powered landing gear drive wheel, an array of cockpit controls, and a system controller, wherein said failsafe system comprises
    a. onboard wheel drive means capable of translating torque through aircraft wheels drivingly connected to power said at least one landing gear drive wheel to move the aircraft independently on the ground without reliance on aircraft engines or tow vehicles;
    b. a gear assembly drivingly connected through a clutch assembly to said onboard wheel drive means;
    c. failsafe means operatively connected to said onboard wheel drive means comprising a solenoid powered lock assembly operatively connected between said onboard wheel drive means and a said gear assembly controllably powered to move between a first unlocked condition, wherein said onboard wheel drive means is drivingly connected to said at least one landing gear drive wheel, and a second locked condition, wherein said onboard wheel drive means is drivingly disconnected from said at least one landing gear drive wheel; further comprising a solenoid powered locking arm pivotally mounted on said onboard wheel drive means and a locking arm receptacle associated with said clutch assembly configured to receive said locking arm; wherein when said lock assembly is in said first unlocked condition, said locking arm is pivoted out of contact with said locking arm receptacle, and when said lock assembly is in said second locked condition, said locking arm is pivoted into engagement with said locking arm receptacle;
    d. a plurality of sensors adapted to receive a first set of information during aircraft independent ground movement relating to a plurality of selected operating parameters indicative of safe or unsafe aircraft ground movement and to transmit said first set of information to a system controller;
    e. a processor associated with the system controller adapted to generate a second set of information determinative of whether said first set of information indicates continued aircraft ground movement to be safe or unsafe; and
    f. a signal communication means adapted to communicate signals based on said second set of information between said system controller, a cockpit controls array, said lock assembly, and said onboard wheel drive means, wherein said lock assembly is signaled to remain in an unlocked condition when operation of said onboard wheel drive means may be continued safely; or said lock assembly is signaled to lock said onboard wheel drive means, thereby interrupting and preventing continued ground movement of said aircraft when operation of said onboard wheel drive means may not be continued safely.

2. The failsafe system described in claim 1, further comprising onboard wheel driver means disabling means configured to include automatic and manual control means adapted to automatically or manually prevent said onboard wheel drive means from translating torque to said at least one wheel in response to one or more operating parameters indicating that continued operation of said aircraft ground movement system is unsafe.

3. The failsafe system described in claim 1, wherein the onboard wheel drive means is mounted on at least one aircraft nose wheel or on at least one aircraft main wheel.

4. The failsafe system described in claim 3, wherein said onboard wheel drive means comprises any motor capable of producing the torque required to move a commercial sized aircraft at an optimum speed for ground movement.

5. The failsafe system described in claim 4, wherein the onboard wheel drive means is a motor selected from the group consisting of electric induction motors, permanent magnet brushless DC motors, switched reluctance motors, hydraulic pump/motor assemblies, and pneumatic motors.

6. The failsafe system described in claim 1, further comprising a source of power selected from the group consisting of an aircraft's auxiliary power unit, an aircraft's main engines, batteries, fuel cells, solar power sources, and burn boxes.

7. The failsafe system described in claim 1, wherein said cockpit controls array comprises a driver locking control means manually actuatable to move said onboard wheel drive means from said first unlocked condition to said second locked condition when said second set of information indicates that continued ground movement of said aircraft would not be safe.

8. The failsafe system described in claim 7, wherein said driver locking control means is a pilot input device.

9. The failsafe system described in claim 1, wherein said plurality of sensors comprises sensors selected from the group consisting of speed sensors, torque sensors, brake sensors, acceleration rate sensors, power sensors, traction sensors, and lock activation sensors.

10. The failsafe system described in claim 1, wherein said processor comprises a microprocessor in signal communication with said cockpit controls array, said onboard wheel drive means, said lock assembly, and said plurality of sensors.

11. The failsafe system described in claim 1, wherein said gear assembly is positioned in selective driving engagement with said onboard wheel drive means through said lock assembly and is movable into or out of driving engagement with said onboard wheel drive means by automatic or manual activation or deactivation of said lock assembly.

12. The failsafe system described in claim 11, further comprising a cockpit control means in communication with said processor means controllable automatically or manually to activate or deactivate said lock assembly in response to said first set of information.

13. The failsafe system described in claim 12, wherein said cockpit control means comprises a cockpit controls array manually actuatable to prevent said wheel drive means from translating torque to and driving said at least one wheel.

14. A method for ensuring the failsafe operation of an aircraft equipped with the failsafe system of claim 1, comprising:
  a. equipping an aircraft with at least one nose or main landing gear drive wheel powered by an onboard wheel drive means capable of translating torque through aircraft wheels and controllable to move an aircraft independently on the ground, a cockpit controls array, and a supply of power other than the aircraft main engines;
  b. further equipping the aircraft with a control system comprising at least a system controller, a said processor, and a said plurality of sensors designed to obtain information relating to selected aircraft operating parameters required for safe ground operation;
  c. positioning said powered lock assembly in driving communication with said onboard wheel drive means and in control communication with said control system actuatable to activate or inactivate said onboard wheel drive means;
  d. using the plurality of sensors to obtain a the first set of information relating to the selected aircraft operating parameters while the onboard wheel drive means is moving the aircraft during aircraft ground movement and communicating the first set of information to the processor;
  e. using said processor to compare the first set of information obtained from the plurality of sensors with safe operating ranges for said selected aircraft operating parameters and generating signals comprising a second set of information indicating whether sensed parameters in the first set of information are within or outside said safe operating ranges;
  f. sending said signals comprising the second set of information to aircraft and ground movement system components, comprising at least the cockpit controls array, the onboard wheel drive means and the powered lock assembly, that are actuatable in response to said signals; and
  g. actuating said aircraft and ground movement system components as required in response to said signals indicating that sensed parameters are within or outside safe operating ranges to continue ground movement of the aircraft when the sensed parameters are within safe operating ranges or to stop ground movement of the aircraft when the sensed parameters are outside safe operating ranges.

15. The failsafe method described in claim 14, wherein said onboard drive means is actuated automatically by the system controller or manually by pilot input to the cockpit controls array or through actuation of the lock assembly to become inoperative in response to at least one sensed parameter outside said safe operating ranges, thereby preventing continued ground movement of the aircraft.

16. The failsafe method described in claim 15, wherein a sensed interruption of the aircraft power supply signals said onboard driver means to become inoperative and unable to translate torque to said at least one drive wheel to move the aircraft on the ground.

17. The failsafe method described in claim 14, further comprising:
  when the sensed parameters are within safe operating ranges, actuating the powered lock assembly to pivot the locking arm to the first unlocked condition, with the clutch assembly in driving contact between the onboard wheel drive means and the gear assembly to drive the aircraft landing gear wheel; and
  when the sensed parameters are outside safe operating ranges, pivoting the locking arm to the second locked condition so that the clutch assembly is moved out of driving contact between the onboard wheel drive means and the gear assembly and the aircraft landing gear wheel cannot be driven.

* * * * *